INVENTORS.
STUART H. MALAVASI
PETER A. DANZO JR.
BY WALTER R. PETERSON

ATTORNEYS.

United States Patent Office 3,512,042
Patented May 12, 1970

---

3,512,042
HIGH FREQUENCY PULSED IGNITION SYSTEM
Stuart H. Malavasi, West Millington, Peter A. Danzo, Jr., Cedar Grove, and Walter R. Peterson, Belleville, N.J., assignors to Ranco Incorporated, Columbus, Ohio, a corporation of Ohio
Filed Mar. 27, 1968, Ser. No. 716,511
Int. Cl. H05b 37/02, 39/04
U.S. Cl. 315—209
6 Claims

ABSTRACT OF THE DISCLOSURE

An ignition system for a fuel burner including a transformer having a primary winding, a secondary winding and a feedback coil, a transistor having an output circuit connected in series with the transformer primary and a control electrode connected to the feedback winding so that the transistor is rapidly rendered conductive and non-conductive in response termination and initiation, respectively, of current flow in the transformer primary and causing high frequency ignition arcs across a spark gap connected across the transformer secondary. The operation of the arc producing circuitry is modulated by a semi-conductor switch in the form of an SCR and in one disclosed embodiment a switching circuit is provided with oppositely poled SCR's which permit operation of the ignition circuitry during a half cycle of the power supply in which circuitry associated with the ignition circuitry does not operate.

---

Figure 1:
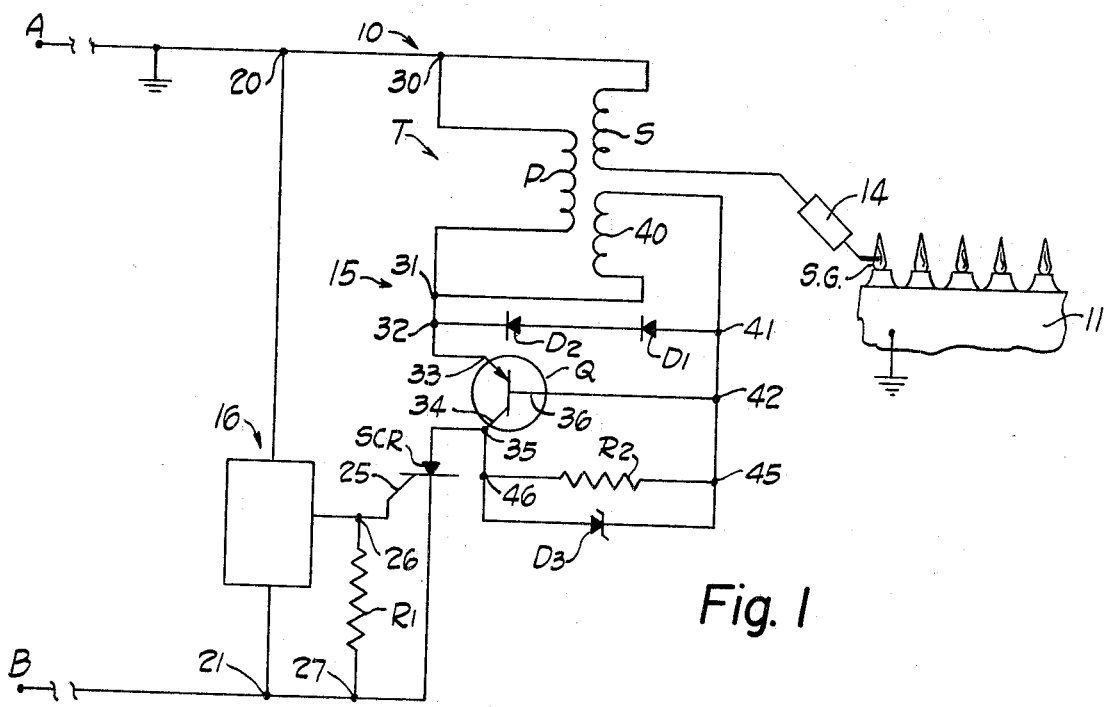

The present invention relates to ignition systems and more particularly relates to electrically energized ignition systems for fuel burners or the like.

Electrically energized ignition system for fuel burners of various types, as well as spark ignition internal combustion engines, are generally constructed so that an arc is struck through a combustible fuel mixture between spaced electrodes at a time when combustion of the mixture is desired. In engine ignition systems a single arc may be provided by the system, while ignition systems for fuel burners have been constructed to provide a number of arcs at a fuel burner. One device of the last mentioned type is illustrated and described in U.S. Pat. 3,445,173 assigned to the assignee of this invention.

In a multiple arc ignition system, such as that disclosed by the patent application referred to, relatively large and expensive capacitors are utilized in the circuitry and which capacitors are charged and then discharged at an appropriate time through a primary winding of a step-up transformer, having a secondary winding connected across the spark gap. In this manner, it is possible to provide two arcs per cycle of operation of the capacitor or capacitors, one arc being struck at the capacitor discharges through the transformer primary inducing a voltage of a first sense across the spark gap and the second arc being struck when the field about the transformer primary collapses inducing a voltage of the opposite sense across the spark gap.

In certain burner installations, the fuel to be ignited is in a gaseous state and passes through the spark gap at high velocities sometimes causing the arcs produced by the ignition system to be blown out, or away from the gap without igniting the fuel. In such cases ignition of fuel at the burner may be relatively difficult and hazardous since relatively large amounts of unburned fuel can be expelled from such burners in a relatively short period of time.

The present invention provides a new and improved ignition system for combustion equipment wherein extremely high frequency, ignition arcs are provided across a spark gap and which arcs collectively strongly resist being blown out or away from the gap by fuel passing through the gap at high velocity and which ignition system includes circuitry for producing the high frequency ignition arcs without requiring relatively expensive capacitors for providing an energy source for producing the arcs.

Another object of the present invention is the provision of a new and improved electric arc generator for a fuel ignition system which produces electrical arcs at a frequency of several kilocycles between an electrode and a grounded burner, or the like, so that a large substantially continuous arc is provided which "walks," or takes a number of different paths through a fuel mixture adjacent the burner, to provide for ignition of fuel over a relatively large area.

Yet another object of the present invention is the provision of a new and improved oscillator circuit including a transformer having a primary winding and at least one secondary winding, a semi-conductor element having a control electrode connected in circuit with the secondary winding and an output circuit connected in circuit with the primary winding, and swith means in the output circuit for permitting the output circuit to become conductive, and wherein conduction in the output circuit results in transformer action so that a relatively large number of electrical oscillations are produced permits conduction in the output circuit.

In carrying out the present invention there is provided an electric ignition system for combustion apparatus such as a gas burner which includes a source of electrical power, a switch which is periodically rendered conductive, a transformer having a primary winding and first and second secondary windings, and a semi-conductor element having an output circuit connected in series with the transformer primary and the switch, and a control electrode connected in series with the first of the secondary windings whereby conduction in the output cidcuit produces transformer action and a pulse of current in the first secondary circuit to render the semi-conductor output circuit non-conducting so that an oscillating current is produced in the secondary winding of the transformer which is connected across a spark gap so that electric arcs are produced across the gap at frequencies on the order of several kilocycles.

Figure 2:
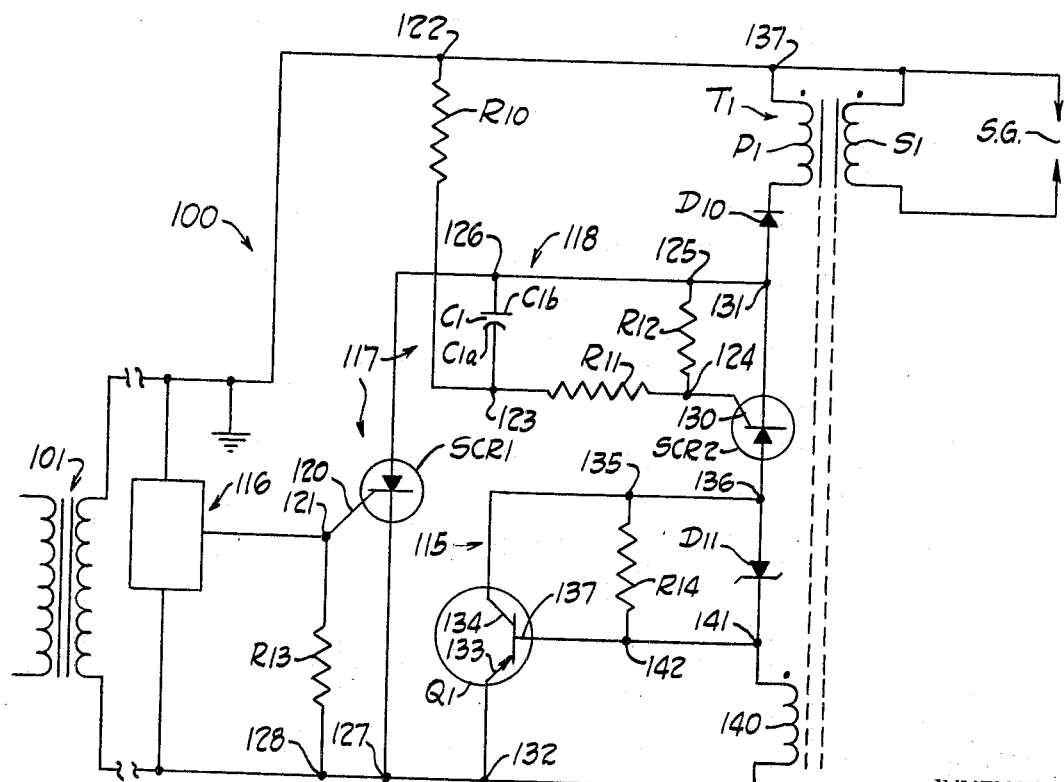

Other objects and advantages of the present invention will become apparent from a consideration of the following detailed description thereof made with reference to the accompanying drawings which form a part of the specification and wherein:

FIG. 1 is a schematic illustration of an ignition system embodying the present invention; and FIG. 2 is a schematic illustration of a modified ignition system embodying the present invention.

FIG. 1 illustrates an ignition system 10 for establishing a flame at a gas or oil burner 11 only a part of which is illustrated. The system 10 is connected across a suitable alternating current power supply at the terminals A, B and in the preferred embodiment the power supply (not shown) includes a conventional stepdown transformer having a primary winding connectable to a 117 volt AC power supply such as that which might be found in a household or plant and a secondary winding which provides 24 v. AC power to the system 10 across the terminals A, B.

The system 10 provides high frequency arcs between an arc electrode 14 and the burner 11 which is electrically grounded at G and includes an oscillator, generally designated at 15, and a signal circuit 16 which is constructed to produce 60 cycle signal pulses to the oscillator circuitry 15 for controlling the operation of the oscillator circuitry during positive half cycles of the power supply. The signal circuitry 16 may be of any suitable construction but is preferably the same as illustrated in the aforementioned U.S. Pat. No. 3,445,173. An energizing circuit for the circuitry 16 may be traced, during a positive half cycle of the power supply, from the terminal A to a junction 20, the circuitry 16, a junction 21 and to the terminal B. During a negative half cycle of the power supply the circuitry 16 is effective to prevent current from flowing in an opposite direction through the aforementioned energizing circuit. It is to be understood that according to the convention used in the description the term "positive half cycle of the power supply" refers to half cycles wherein the terminal A is positive with respect to the terminal B and that "negative half cycle" refers to half cycles wherein the terminal B is positive with respect to the terminal A.

The signal circuit 16 is associated with a control switch for the oscillator circuitry 15 and which control switch is preferably in the form of an SCR having a control electrode 25 connected to the signal circuitry 16 through a junction 26. The SCR is connected in series with the oscillator circuitry 15 across the terminals A, B and includes anode and cathode electrodes which are oriented so that the oscillator circuitry 15 is energizable during positive half cycles of the power supply through the SCR when the control electrode 25 of the SCR receives pulses from the circuitry 16. A resistor R1 is connected in parallel with the control electrode 25 and cathode electrode of the SCR between the junction 26 and a junction 27 connected to the terminal B so that a triggering voltage level for the SCR is established at the control electrode 25 in response to a signal from the circuitry 16.

The oscillator circuitry 15 includes a transformer T and a semiconductor element in the form of a PNP transistor Q. The transformer T includes a primary winding P which is connected in series with the emitter and collector electrodes of the transistor Q and the SCR across the terminals A, B of the power supply through a circuit which may be traced from the terminal A through a junction 30, the primary P of the transformer T, junctions 31, 32, emitter 33, and collector 34 of the transistor Q, a junction 35, anode and cathode electrodes of the SCR and to the terminal B. Negative feedback is provided, as more fully hereinafter disclosed, which reduces current in the oscillator, thereby reducing transformer wire size while still producing high voltage in the secondary.

The transformer T includes a secondary winding S which is inductively coupled to the primary winding P to provide a secondary circuit including the junction 30, the secondary winding S, spark electrode 14, the grounded burner 11 and a spark gap generally designated SG between the electrode 14 and the burner 11. The secondary winding includes a relatively greater number of turns than that of the primary P and accordingly the induced voltage across the secondary circuit is significantly greater than the voltage across the primary P. In the preferred construction of the present invention the primary winding P comprises approximately 183 turns while the secondary winding S comprises approximately 28,000 turns.

The primary and secondary windings of the transformer T are oriented with respect to each other so that as current flow through the primary is initiated the developing electromagnetic field about the primary P induces a current in the secondary S so that the voltage at the spark electrode 14 becomes positive with respect to the voltage at the burner 11. When the voltage across the spark gap SG is sufficiently high to ionize the gas between the electrode 14 and the burner 11 an electric arc is produced between the electrode 14 and burner 11.

When the current flow through the primary winding P is terminated, the field about the primary collapses resulting in an induced current in an opposite direction in the secondary winding S resulting in the voltage at the burner 11 becoming positive with respect to the voltage at the electrode 14 and causing an electric arc from the burner 11 to the electrode 14. The turns ratio of the primary and secondary winding of the transformer T is such that a peak voltage level of about 15 kilovolts is produced across the spark gap of a 24 volt system.

Conduction in the primary P of the transformer T is controlled by the transistor Q which is rendered conductive to initiate current flow through the primary P and rendered non-conductive to terminate current flow through the primary winding. In the preferred embodiment the conductive state of the transistor Q is altered approximately 10,000 times per second to produce 10 kilocycle arcs between the electrode 14 and burner 11 as described previously.

A resistor R2 is connected across the base electrode 36 and collector electrode 34 of the transistor Q so that when the SCR is initially rendered conductive an input circuit for the transistor is established through the emitter and base electrodes and to the terminal B through the SCR. Conduction in the input circuit results in the emitter-collector circuit of the transistor being rendered conductive.

After initial conduction of the transistor is established the conductive state of the transistor Q is controlled by operation of a feedback coil 40 which is inductively coupled to the primary P of the transformer T and which is connected to the base electrode 36 of the transistor Q. When the transistor Q is conductive a current pulse is transmitted through the primary P junctions 31, 32, the emitter-collector circuit of the transistor Q, and to the terminal B through the SCR. Current flow through primary P induces current in the feedback coil 40 through a junction 41, diodes D1, D2, junctions 32, 31, and to the negative end of the feedback coil 40. The junction 41 is connected to a junction 42 at the base 36 of the transistor Q so that the voltage at the base 36 of the transistor Q is maintained at the voltage level of the junction 41. The voltage drop across the diodes D1, D2 produces a voltage at the junction 32 which is negative with respect to the voltage at the junction 41 and accordingly the emitter 33 of transistor Q which is connected to the junction 32, is negative with respect to the base electrode 36 by the amount of the forward voltage drop across the diodes D1, D2. Thus the transistor Q is rendered non-conductive. It is apparent that the diodes D1, D2 protect the transistor Q from conduction from its base 36 through its emitter 33 which might otherwise occur and damage the transistor Q.

A Zener diode D3 is connected in parallel with the base and collector 36, 34 respectively. The cathode electrode of the Zener diode is connected to the base 36 and the anode electrode is connected to the collector 34. The Zener diode is selected to break down and conduct from the junction 42 through junction 35, the SCR, and to the terminal B at a voltage level across it which is slightly lower than the maximum permissible voltage across the base and collector electrodes of the transistor Q. Thus the transistor Q is protected against conduction from the base through the collector which might otherwise damage the transistor. It should also be appreciated that breaking down of the Zener diode D3 is effective to limit the voltage across the collector and emitter circuit of the transistor Q and thus prevents conduction from the collector and through the emitter electrode to the negative end of the feedback winding.

When the transistor Q is rendered non-conductive, current flow in the primary P collapses causing the transistor Q to again become conductive by virtue of feedback coil 40 to initiate another cycle of operation of the oscillator circuitry 15 as described previously. The relationship of the oscillator circuitry and feedback coil 40 to the primary winding P is such that the transistor Q is operated between conductive and non-conductive conditions at a frequency of approximately 10 kilocycles, or kilohertz, so that 10 kc. arcs are produced in the spark gap SG, and which have a peak level of approximately 15 kilovolts. Due to the high frequency production of arcs across the spark gap SG, ionization of the gas adjacent the burner 11 and spark electrode 14 takes place through a relatively large number of paths. Thus what appears to the observer to be "the arc" between the electrode and burner "walks" along these members and exposes a greater flow area of fuel to the igniting arc than the flow area exposed to a single arc or relatively low frequency arcs. Furthermore, because of the large number of arcs the tendency for high velocity fuel flow to "blow out" the arcs is minimized since the great number of high voltage arcs collectively reduce the possibility of blow out.

It should be apparent from the foregoing description that the arcs across the spark gap are modulated by the 60 cycle pulses from the signal circuit 16 and the SCR. When the SCR is non-conductive during negative half cycles of the power supply, the circuitry 15 is ineffective to produce the arcs referred to. Additionally, when the pulsing circuit 16 no longer produces pulses during positive half cycles of the power supply, the SCR is no longer rendered conductive and the circuitry 15 does not operate.

FIG. 2 illustrates a modified ignition system 100 embodying the present invention wherein high frequency arcs are produced between a spark electrode and grounded burner (not illustrated in FIG. 2) during negative half cycles of the power supply. It is to be noted that an ignition system constructed in accordance with the present invention is adapted to be associated with flame supervisory circuitry which may include flame sensing circuitry or apparatus and circuits or circuit elements for performing various functions in response to operation of the flame sensing circuitry. An example of a flame supervisory circuit of the type referred to is illustrated in the aforementioned United States patent application Ser. No. 618,090. While the precise construction of such circuitry is not necessary for an understanding of the operation of the instant flame ignition system, such circuitry often operates during only one half cycle of the power supply, i.e., only during positive half cycles of the power supply, or only during negative half cycles. If the flame supervisory circuitry is adapted for operation during positive half cycles of the power supply it may be desirable to provide an ignition system which operates only during negative half cycles of the power supply so that transients produced by operation of the ignition system do not adversely affect functioning of other parts of the flame supervisory system and vice versa. The ignition system 100 illustrated in FIG. 2 is adapted to be utilized in conjunction with flame supervisory circuitry which is energized during positive half cycles of the power supply so that the ignition system is not operating during the time that the auxiliary circuitry performs its control functions.

The ignition system 100 is associated with a power supply 101 formed by the primary and secondary windings of a stepdown transformer the primary winding of which is connectable to a 117 v. AC outlet and the secondary of which provides 24 v. AC power to the ignition system. The system 100 includes an oscillator circuit generally designated at 115, a signal circuit 116 which is effective to produce pulses during positive half cycles of the power supply, and a switching network generally designated at 117 which controls operation of the oscillator 115 in response to pulses from the signal circuit 116.

The pulsing circuit 116 is preferably of the same construction as the pulsing circuit 16 referred to in reference to FIG. 1 and produces positive current pulses during positive half cycles of the power supply. The switching network 117 includes an SCR1 and an SCR2 which are interconnected by a gating circuit 118. The SCR1 is oriented for conduction during positive half cycles of the power supply and includes a control electrode 120 connected to the pulsing circuit 116 through a junction 121. The pulsing circuit 116 provides the aforementioned signal pulses to the control electrodes 120 of SCR1 so that the SCR1 is rendered conductive to establish a circuit which may be traced from the secondary winding of the power supply through a junction 122, a resistor R10, a junction 123, a resistor R11, a junction 124, a resistor R12, junctions 125, 126, through the SCR1 and to the negative side of the secondary winding through a junction 127. A "gate strap" resistor R13 is connected between the junction 121 at the control electrode 120 of the SCR1 and the negative terminal of the transformer secondary through a junction 128, and which resistor is effective to maintain a voltage level at the control electrode 121 which is sufficiently positive to produce triggering of the SCR1.

Conduction of the SCR1 charges a capacitor C1 connected between the junctions 123, 126, in parallel with the resistors R11, R12, with the plate C1a of the capacitor C1 being positive relative to the plate C1b of the capacitor C1 due to the voltage drop across the resistors R11, R12. During a negative half cycle of the power supply the SCR1 is rendered non-conductive and the capacitor C1 discharges to render the SCR2 conductive. A discharge circuit for the capacitor C1 can be traced through the junction 123, a resistor R11, junction 124, a control electrode 130 of the SCR2, a junction 131 and to the plate C1b of the capactor C1 through the junctions 125, 126. Discharging of the capacitor C1 provides a pulse to the control electrode 130 of the SCR2 which renders that SCR conductive to provide for energization of the oscillator circuitry 115. The resistor R12 connected between the junctions 124, 125 provides a "gate strap" for the SCR2 to insure a triggering voltage level at the control electrode 130 of the SCR2 during discharging of the capacitor C1.

The oscillator circuit 115 includes a transformer T1 having a primary winding P1 and a secondary winding S1 which are substantially the same as described above in reference to FIG. 1. The oscillator circuitry 115 additionally includes a PNP transistor Q1 having its emitter and collector electrodes connected in series with the SCR2 and the primary winding P1 of the transformer T1 so that the SCR2 and transistor Q1 are rendered conductive during a negative half cycle of the power supply a circuit is established through junctions 128, 127, 132, the emitter 133 and collector 134 of the transistor Q1, junctions 135, 136, the SCR2, junction 131, diode D10, primary P1 of the transformer T1, and to the negative side of the power supply through the junctions 137, 122. The current pulse through the primary P1 induces a current in the secondary winding S1 to produce an arc across a spark gap SG1 which is preferably defined by a spark electrode and grounded burner which are schematically illustrated in FIG. 2.

The current pulse in the transformer primary P1 additionally produces a current pulse in a feedback winding 140 which is inductively coupled to the primary P1 and connected to the base 137 of the transistor Q1. The current produced in the feedback winding 140 renders the base 137 sufficiently positive with respect to the emitter of the transistor Q to terminate conduction of the transistor Q1 causing termination of current flow in the primary winding P1.

A Zener diode D11 is connected in parallel with the base 137 and collector 134 of the transistor Q1 between the junction 136 and a junction 141. The cathode electrode of the Zener diode D11 is connected to the base electrode 137 through the junction 141 and the anode electrode of the diode D11 is connected to the collector 134 through the junctions 136, 135. The Zener D11 is of such character that its Zener voltage is lower than the maximum permissible voltage across the base and collector electrodes of the transistor Q1 and thus prevents conduction from the base through the collector when the transistor Q1 is rendered nonconductive as described. Further, the Zener voltage of the diode D11 limits the maximum voltage across the emitter and collector electrodes of the transistor Q1 so that conduction from the collector to the emitter is prevented during the time that the transistor Q1 is rendered non-conducting.

With the transistor Q1 non-conductive, current through the primary P1 of the transformer T1 is terminated, collapsing the field about the primary P1 and inducing current in the secondary S1 to provide a second arc across the spark gap SG. Collapsing of the field about the primary also induces a current in the feedback winding 140 and through the junction 132, emitter 133 and base 137 of the transistor Q1, to the negative end of the feedback winding 140 which results in the transistor Q1 being rendered conductive as previously described and causing current flow to be reinitiated through the primary winding P1 of the transformer T1 after which another cycle occurs.

The circuitry 115 continues to cycle in the manner described until the SCR2 is rendered non-conductive at the end of the negative half of the power supply. The diode D10, connected in series with the primary winding P1 of the transformer T1, prevents the establishment of current through the primary P1 during positive half cycles of the power supply when the SCR1 is conductive and thus the ignition circuitry operates only during a negative half cycle of the power supply as modulated by conduction of the SCR2.

Initial turning on of the transistor Q1 is effected by establishment of an input circuit for the transistor through the emitter 133, base 137, a resistor R14 and to the negative terminal of the power supply through the SCR2 and primary P1. Thus the resistor R14 connected across the base 137 and collector 134 provides an initial voltage drop across the emitter-base junction of the transistor to permit turning on at the beginning of each negative half cycle.

While two embodiments of the present invention have been illustrated and described herein in considerable detail, the present invention is not to be considered to be limited to the precise constructions shown, for example, where extremely high velocity fuel flows are to be ignited, it is desirable to connect a suitable capacitor in parallel with the spark gap to provide "hotter" sparks than would otherwise be produced. It is the intention to cover hereby all such adaptations, modifications and uses of the present invention.

What is claimed is:

1. In an ignition system for producing high frequency fuel igniting arcs across a spark gap:
    (a) an A.C. power supply;
    (b) a transformer having a primary winding connected across said power supply and a secondary winding connected across said spark gap;
    (c) a semiconductor element having an input circuit including a power electrode and a control electrode, and an output circuit including said first power electrode and a second power electrode;
        (1) said semiconductor element connected in a circuit with said primary winding and said power supply and operative between a conductive and nonconductive condition;
        (2) said semiconductor element initiating current flow in said primary winding in one condition and terminating current flow in said primary winding in said other condition;
    (d) circuitry connected across said input circuit for altering the conductive condition of said semiconductor element in response to initiation and termination of current flow in said primary winding to produce a series of high frequency pulses in said primary winding;
        (1) said circuitry including a feedback transformer winding inductively coupled to said primary winding and connected across said control and said first power electrode of said semiconductor; and,
    (e) control switch means connected in series with said semiconductor element and said primary winding and operable to permit conduction in said primary winding and said semiconductor element only during alternate half cycles of said power supply.

2. An ignition system as defined in claim 1 wherein said semi-conductor element is a transistor having its output circuit rendered conductive in response to a predetermined voltage across said input circuit, said input circuit further including a resistance element connected across said control electrode and said second power electrode, said resistance element establishing initial conduction of said semi-conductor.

3. An ignition system as defined in claim 1 wherein said control switch means includes first and second semiconductor switches and circuitry interconnecting said switches, said first switch operable for conduction during alternate half cycles of a first polarity and effective when conductive to condition said circuitry for triggering said second switch for conduction during a half cycle of said power supply succeeding a half cycle during which said first switch conducts, said second switch connected in series with said transformer primary and said semi-conductor element.

4. In an ignition system for producing high frequency electrical arcs across a spark gap comprising:
    (a) an A.C. power supply;
    (b) a signal circuit connected across said power supply for producing signal pulses during alternate half cycles of said power supply;
    (c) control switch means rendered conductive during alternate half cycles of said power supply in response to signals from said signal circuit; and,
    (d) oscillator circuitry controlled by said switch means and operable to produce high frequency arcs across said spark gap, said oscillator circuitry including:
        (1) a transformer having a primary winding, a secondary winding connected across said spark gap, and a feedback coil inductively coupled to said primary winding; and,
        (2) a semiconductor element having first and second electrodes connected in series with said primary winding and said power supply and a control electrode connected to said feedback coil;
    (e) said semiconductor element having a conductive condition wherein current flow in said primary winding is initiated and nonconductive condition wherein current flow in said primary winding is terminated;
    (f) said feedback coil and said primary winding being coupled together so that initiation of current flow in said primary induces a current in said feedback coil to render said semiconductor nonconductive to terminate current flow in said primary winding, termination of current flow in said primary winding inducing a current in said feedback coil for rendering said semiconductor element conductive, and with initiation and termination of current flow in said primary inducing arc producing voltages in said secondary winding and across said spark gap.

5. An ignition system as defined in claim 4 wherein said semi-conductor element is a transistor and wherein said feedback coil is in a circuit connected across the emitter and base electrodes of said transistor and the emitter and collector electrodes, said circuit including a voltage controlled conductor element connected across the base and collector electrodes of said transistor, said voltage controlled conductor effective to be rendered conductive at a predetermined voltage level thereacross to protect said transistor.

6. An ignition system as defined in claim 4 wherein said control switch means includes first and second controlled rectifiers, one of said rectifiers connected to said signal circuit and rendered conductive during half cycles of said power supply when said signal circuit is operative, said other controlled rectifier connected in series with said semi-conductor element for permitting said semi-conductor to conduct during alternate half cycles of the power supply, and triggering circuitry interconnecting said one controlled rectifier to a control electrode of said other controlled rectifier to render said other controlled rectifier conductive during a half cycle of said power supply immediately following a half cycle during which said one controlled rectifier conducts.

References Cited

UNITED STATES PATENTS

| 3,174,534 | 3/1965 | Weber | 431—255 X |
| 3,280,810 | 10/1966 | Worrell et al. | 315—209 X |
| 3,311,789 | 3/1967 | Remy | 317—96 X |
| 3,331,362 | 7/1967 | Mitchell | 123—148 |
| 3,377,125 | 4/1968 | Zielinski | 317—96 X |

JOHN W. HUCKERT, Primary Examiner

R. F. POLISSACK, Assistant Examiner

U.S. Cl. X.R.

315—200, 219, 276, 278